(12) United States Patent
Palai et al.

(10) Patent No.: US 12,530,931 B2
(45) Date of Patent: Jan. 20, 2026

(54) DISTRIBUTED DIAGNOSTICS ARCHITECTURE FOR A VEHICLE

(71) Applicant: JAGUAR LAND ROVER LIMITED, Coventry (GB)

(72) Inventors: Dibyendu Palai, Leamington Spa (GB); Sachin Shinde, Solihull (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 327 days.

(21) Appl. No.: 17/639,282

(22) PCT Filed: Aug. 27, 2020

(86) PCT No.: PCT/EP2020/073949
§ 371 (c)(1),
(2) Date: Feb. 28, 2022

(87) PCT Pub. No.: WO2021/037965
PCT Pub. Date: Mar. 4, 2021

(65) Prior Publication Data
US 2022/0332334 A1 Oct. 20, 2022

(30) Foreign Application Priority Data

Aug. 30, 2019 (GB) .................................. 1912488
Sep. 2, 2019 (GB) .................................. 1912568

(51) Int. Cl.
*G07C 5/08* (2006.01)
*B60W 50/04* (2006.01)
(Continued)

(52) U.S. Cl.
CPC ........... *G07C 5/0808* (2013.01); *B60W 50/04* (2013.01); *G07C 5/008* (2013.01); *G07C 5/0816* (2013.01);
(Continued)

(58) Field of Classification Search
CPC .... G07C 5/0808; G07C 5/008; G07C 5/0816; B60W 50/04; B60W 2050/0006;
(Continued)

(56) References Cited

U.S. PATENT DOCUMENTS 6,330,499 B1 12/2001 Chou et al.
6,766,230 B1 7/2004 Rizzoni et al.
(Continued)

FOREIGN PATENT DOCUMENTS

JP 2003509258 A 3/2003
JP 2004217016 A 8/2004
(Continued)

OTHER PUBLICATIONS

"Next-Generation Diagnostics for HPC-based Connected Vehicles", DSA; HPC Diagnostics—Proposal Workshop, Hohenkirchen, Germany, dated May 6, 2019, 30 pages.
(Continued)

*Primary Examiner* — Rachid Bendidi
*Assistant Examiner* — Kirsten Jade M Santos
(74) *Attorney, Agent, or Firm* — TROUTMAN PEPPER LOCKE LLP; Dustin B. Weeks; Nicholas H. Doss

(57) ABSTRACT

The present disclosure relates to a distributed diagnostics architecture for a vehicle. The diagnostics architecture comprises a plurality of application functions hosted on a central compute platform (CCP) of the vehicle, a plurality of remote input/output concentrator modules (RIOs) provided at different locations within the vehicle, and a vehicle diagnostics manager (VDM). The application functions are configured to control vehicle functions. The application functions are further configured to run diagnostic fault monitors pertaining to strategic or system-level faults for their associated vehicle functions, and to transmit strategic fault data related to their associated vehicle functions to the VDM. The RIO
(Continued)

are connected to I/O devices of the vehicle. The RIOs are configured to run diagnostic fault monitors pertaining to physical or component-level faults for their associated I/O devices, and to transmit physical fault data related to their associated I/O devices to the VDM. The VDM is configured to aggregate the received strategic and physical fault data, and to maintain a central fault record of strategic and physical faults.

17 Claims, 2 Drawing Sheets

(51) Int. Cl.
*G07C 5/00* (2006.01)
*B60W 50/00* (2006.01)

(52) U.S. Cl.
CPC .............. *B60W 2050/0006* (2013.01); *B60W 2050/041* (2013.01)

(58) Field of Classification Search
CPC .............. B60W 2050/041; B60L 3/12; G05B 23/0264; G05B 23/0275; G06F 9/4411
See application file for complete search history.

(56) References Cited

U.S. PATENT DOCUMENTS

| | | | |
|---|---|---|---|
| 6,950,782 | B2 | 9/2005 | Qiao et al. |
| 2004/0078125 | A1 | 4/2004 | Woodard et al. |
| 2009/0295559 | A1* | 12/2009 | Mark .................... B60Q 11/00 |
| 2010/0057511 | A1 | 3/2010 | Mansouri |
| 2010/0152969 | A1 | 6/2010 | Li et al. |
| 2018/0182184 | A1 | 6/2018 | Zoppelt et al. |
| 2018/0232959 | A1 | 8/2018 | Thornburg et al. |
| 2019/0066399 | A1* | 2/2019 | Shengbing ............ B60R 16/023 |

FOREIGN PATENT DOCUMENTS

| | | |
|---|---|---|
| JP | 2005048770 A | 2/2005 |
| JP | 2005265454 A | 9/2005 |
| JP | 2017094970 A | 6/2017 |

OTHER PUBLICATIONS

Thomas Falschebner, "Why do we need a new Diagnostics for HPC Systems", Porsche AG; HPC Diagnostics—Proposal Workshop, Hohenkirchen, Germany.
Combined Search and Examination report corresponding to Great Britain Application No. GB1912488.2, dated Dec. 23, 2021, 5 pages.
Combined Search and Examination report corresponding to Great Britain Application No. GB1912488.2, Feb. 26, 2020, 8 pages.
Great Britain Office Action corresponding to Great Britain Application No. GB1912488.2, dated Dec. 23, 2021, 5 pages.
Great Britain Office Action corresponding to Great Britain Application No. GB1912568.1, dated Dec. 23, 2021, 5 pages.
International Search Report corresponding to International Application No. PCT/EP2020/073949, dated Dec. 3, 2020, 5 pages.
Written Opinion corresponding to International Application No. PCT/EP2020/073949, dated Dec. 3, 2020, 10 pages.
English translation of Japanese Notification of reasons for rejection corresponding to application 2023-504454, dated Feb. 1, 2024, 3 pages.
English translation of Japanese Notification of reasons for rejection corresponding to application 2022-513400, dated Sep. 3, 2024, 10 pages.
European Office Action corresponding to application 20764354.5, dated Mar. 18, 2025, 9 pages.

* cited by examiner

DISTRIBUTED DIAGNOSTICS ARCHITECTURE FOR A VEHICLE

TECHNICAL FIELD

The present disclosure relates to a distributed diagnostics system for a vehicle and particularly, but not exclusively, to a distributed diagnostics system for an automotive vehicle such as a car. Aspects of the invention relate to a diagnostics architecture and to a vehicle comprising a diagnostics architecture.

BACKGROUND

Modern automotive vehicles such as cars typically include a large number of application functions for controlling different functions of the vehicle. For example, within the body domain of a vehicle, seat application functions may be provided for controlling operation of the vehicle's seats, and door application functions may be provided for controlling operation of the vehicle's doors.

In a traditional electronic architecture, a vehicle's various application functions are hosted on a large number of individual electronic control units (ECUs) that are distributed throughout the vehicle, with each ECU also hosting drivers for input/output (I/O) devices associated with its particular application function(s). For example, continuing with the body domain example, a vehicle might include front left, front right, rear left and rear right seat ECUs each hosting seat application functions and I/O drivers for a respective one of the vehicle's seats, and front left, front right, rear left and rear right door ECUs each hosting door application functions and I/O drivers for a respective one of the vehicle's doors.

Using this traditional electrical architecture, identifying, triaging and recording faults is comparatively simple because the ECUs distributed throughout the vehicle host both the application functions and the drivers for the I/O devices such as sensors and actuators associated with those application functions. The ECUs are therefore able to run diagnostic tests or fault monitors pertaining to both physical or component-level faults (that is faults related to I/O devices and to the vehicle's communication channels) and strategic or system-level faults (that is higher level faults related to the availability, performance or health of the vehicle's application functions). This fault data may then be used to detect physical and strategic faults, which may be triaged in order to classify detected faults as being either cause faults (that is root cause faults that require a direct repair action) or consequence faults (that is faults that are caused or detected as a consequence of a root cause fault and may not require a direct repair action).

The above-described electrical architecture results in the need for vehicles to include a large number of individual ECUs, as well as complicated wiring harnesses. In order to reduce the number of ECUs and the complexity of the wiring harness in vehicles, it may be desirable to move at least some of the vehicle's application functions away from dedicated ECUs, for example onto a central feature hosting system or central compute platform that is able to control various different functions for different sub-systems of the vehicle. The movement of a vehicle's application functions away from dedicated ECUs is known as functional partitioning. In this case the drivers for the I/O devices may still be distributed throughout the vehicle. For example, I/O drivers may be hosted on a plurality of remote input/output concentrator modules or RIOs, each of which may host drivers for and facilitate communication with I/O devices of multiple different sub-systems.

However, moving application functions away from ECUs on which the drivers for the I/O devices associated with those application functions are hosted presents challenges for identifying, triaging and recording faults. In particular, since the application functions are separated from the hardware on which the I/O drivers are located, neither the application functions nor the RIOs will have access to all of the physical and strategic fault data required for effectively triaging detected faults in order to determine cause and consequence faults.

The present invention has been devised to mitigate or overcome at least some of the above-mentioned problems.

SUMMARY OF THE INVENTION

According to an aspect of the present invention there is provided a distributed diagnostics architecture for a vehicle, the diagnostics architecture comprising: a plurality of application functions hosted on a central compute platform (CCP) of the vehicle, a plurality of remote input/output concentrator modules (RIOs) provided at different locations within the vehicle, and a vehicle diagnostics manager (VDM); wherein each application function is configured to: control an associated function of the vehicle, run diagnostic fault monitors pertaining to strategic or system-level faults of the associated vehicle function, and periodically transmit the output of the strategic fault monitors to the VDM; wherein each RIO is connected to one or more associated I/O devices of the vehicle, and is configured to: run diagnostic fault monitors pertaining to physical or component-level faults of the associated I/O devices, and periodically transmit the output of the physical fault monitors to the VDM; wherein the VDM is configured to: aggregate the received fault monitor output data, detect strategic and physical faults in dependence on the received fault monitor output data, and maintain a central fault record of strategic and physical faults.

It will be appreciated that the CCP is a central computing system comprising at least one processor module and at least one memory module that is used to host software applications or application functions for controlling operation of various different vehicle sub-systems. The VDM and the central fault record may also be hosted on the CCP together with the application functions. It will also be appreciated that the RIOs are control modules that are connected to and configured to facilitate communication with I/O devices of one or more vehicle sub-systems, including I/O devices related to the application functions hosted on the CCP.

It will further be appreciated that the output of the strategic and physical fault monitors is raw fault monitor output data, for example in the form of pass/fail data indicating whether or not a particular fault condition has been detected, as opposed to confirmed diagnostic trouble codes (DTCs), which may subsequently be generated in dependence on the output of the strategic and physical fault monitors.

The periods at which the output of the strategic and physical fault monitors is transmitted from the application functions and the RIOs to the VDM may be based on the periodicity of the individual fault monitors. For example, pass/fail data may be transmitted from application functions and RIOs to the VDM upon generation, or alternatively after a predetermined number of fault monitor cycles.

The diagnostics architecture is distributed since the application functions that control the vehicle's functions and generate strategic fault data are separated from the RIOs that provide interfaces with the vehicle's I/O devices and generate physical fault data. However, by configuring the VDM to receive strategic fault data from the application functions and physical fault data from the RIOs, the diagnostics architecture of the present invention allows the VDM to aggregate all of the fault data required in order to detect and triage physical and strategic faults, and to maintain a vehicle-wide record of faults.

In addition, by transmitting all pass/fail data pertaining to strategic and physical faults to the VDM, the level of fault data available to the VDM can be maximised. The VDM may therefore also be capable of detecting degraded health of components and vehicle functions, and of predicting the occurrence of specific faults before any DTC has been generated for that fault. The VDM may also be capable of triaging, classifying and recording faults before DTCs have been generated for all of the faults related to a particular cause fault.

In this way, the diagnostic architecture of the present invention allows for efficient detection and recording of faults in a vehicle in which at least some application functions are hosted on a central compute platform.

The VDM may be configured to generate DTCs for detected strategic and physical faults in dependence on the received fault monitor output data, and to store the generated DTCs in the central fault record. By generating confirmed DTCs at the VDM, it is possible to omit the fault qualification logic required for generating confirmed DTCs from the application functions and RIOs, thereby reducing the complexity of the application functions and RIOs.

The VDM may be configured to triage detected strategic and physical faults in order to classify the detected faults as being either cause faults or consequence faults. By identifying detected faults as being either cause faults or consequence faults, it is possible to avoid unnecessary reporting of consequence faults which do not require their own individual repair actions, thereby simplifying the process of identifying the root cause and appropriate repair action(s) following the detection of multiple faults.

The triaging of detected faults may comprise triaging the received fault monitor output data from the application functions and RIOs in order to classify the detected faults as being either cause faults or consequence faults. By triaging detected faults based on the received fault monitor output data it is possible for the VDM to triage faults and determine a cause fault before DTCs have been generated for all of the faults related to a particular cause fault. In addition, since the fault monitor output data received from the application functions and RIOs includes more information than the subsequently-generated DTCs, triaging faults based on the raw fault monitor output data allows for more detailed and accurate fault triaging than would be possible based on DTCs alone.

The central fault record may be maintained in a central fault memory system associated with the VDM. The central fault memory system may comprise a primary fault memory and a user-defined secondary fault memory. The VDM may be configured to store a record of cause faults in the primary fault memory and to store a record of consequence faults in the user-defined secondary fault memory. It will be appreciated that the primary fault memory is a digital storage that is configured to be accessed by any diagnostic client (for example an on-board or off-board tester) that is connected to the vehicle's diagnostics system using a standard diagnostic protocol interface, for example the Unified Diagnostics Services (UDS) protocol interface defined by ISO (the International Organisation for Standardisation). In contrast, the user-defined secondary fault memory is a digital storage that is configured to be accessed only by manufacturer approved diagnostic clients, or upon receipt of a specific request which may be defined by the manufacturer of the vehicle.

By storing a record of cause faults in the primary fault memory and a record of consequence faults in the user-defined secondary fault memory, it may be ensured that a complete record of all detected faults is maintained (and accessible to the vehicle's manufacturer), but that only cause faults are reported when diagnostic data is requested by a diagnostic client using a standard UDS protocol interface.

The central fault memory system may also be hosted on the CCP together with the application functions and the VDM.

The RIOs and application functions may be configured to detect physical and strategic faults, to determine an appropriate fault reaction upon detection of a physical or strategic fault, and to initiate the determined fault reaction. In this way the RIOs and application functions may be capable of initiating appropriate fault reactions in response to detected physical and strategic faults independently of the VDM without waiting for confirmed DTCs to be generated in connection with those faults.

In this case the RIOs and application functions may be provided with fault detection logic for identifying physical and strategic faults and determining appropriate fault reactions. However, since the VDM includes the fault qualification logic required for generating confirmed DTCs and is configured to maintain a central fault record of strategic and physical faults, it is not necessary for the individual RIOs and application functions to be provided with the DTC qualification logic required for generating confirmed DTCs.

The VDM may be configured to maintain a keep alive interface with the RIOs, and the RIOs may be configured, upon detecting an interruption in the keep alive interface, to start maintaining local fault records of physical faults. The RIOs may not be required to maintain local fault records of physical faults as long as the keep alive interface is validly received because physical fault data is normally recorded in the central fault record maintained by the VDM. However, by starting to maintain local fault records of physical faults in response to an interruption in the keep alive interface it may be ensured that a record of physical faults is maintained in the case of an interruption of communication between the RIOs and the VDM, for example due to a fault in the vehicle's wiring harness.

The local fault records are preferably maintained in user-defined secondary fault memories of the individual RIOs, and not in primary fault memories. The local fault records may include the output of the physical fault monitors since the RIOs lack the DTC qualification logic required for generating confirmed DTCs.

According to another aspect of the present invention there is provided a distributed diagnostics architecture for a vehicle, the diagnostics architecture comprising: a plurality of application functions hosted on a central compute platform (CCP) of the vehicle, a plurality of remote input/output concentrator modules (RIOs) provided at different locations within the vehicle, and a vehicle diagnostics manager (VDM); wherein each application function is configured to: control an associated function of the vehicle, run diagnostic fault monitors and detect strategic or system-level faults of the associated vehicle function, and report detected strategic faults to the VDM; wherein each RIO is connected to one or more associated I/O devices of the vehicle, and is configured to: run diagnostic fault monitors and detect physical or component-level faults for its associated I/O devices, and report detected physical faults to the VDM; wherein the VDM is configured to: aggregate the received strategic and physical fault notifications, and maintain a central fault record of strategic and physical faults.

The VDM and the central fault record may be hosted on the CCP together with the application functions.

By configuring the VDM to receive fault notifications for detected strategic and physical faults from the application functions and RIOs, the diagnostics architecture of the present invention allows the VDM to aggregate all of the fault data required in order to triage physical and strategic faults, and to maintain a vehicle-wide record of faults. In addition, by only forwarding notifications for confirmed faults from the application functions and RIOs to the VDM, signal traffic across the vehicle's communications network may be minimised. In this way, the diagnostic architecture of the present invention allows for efficient detection and recording of faults in a vehicle in which at least some application functions are hosted on a central compute platform.

The application functions and RIOs may be configured to generate DTCs for detected strategic and physical faults, and to transmit the generated DTCs to the VDM for storage in the central fault record. By generating DTCs at the application functions and RIOs and reporting the generated DTCs to the VDM it is possible to reduce the amount of communication required between the application functions and RIOs and the VDM since the VDM does not require access to the output information of the individual fault monitors based on which DTCs are generated.

The application functions and RIOs may be configured to report detected faults to the VDM using an event-driven communication interface. Faults may be reported to the VDM upon confirmation, for example in response to a change in DTC status byte.

The RIOs may be configured to maintain fault records of physical faults, and the application functions may be configured to maintain fault records of strategic faults. For the avoidance of doubt, it will be appreciated that the RIOs may maintain the physical fault records continuously, and not only in response to an interruption in communication with the VDM. The physical and strategic fault records maintained by the RIOs and application functions may include DTCs and/or fault monitor output information (for example pass/fail information) from the individual fault monitors run by the RIOs and application functions.

The physical fault records may be maintained in user-defined secondary fault memories of the RIOs, and the strategic fault records may be maintained in user-defined secondary fault memories associated with the application functions. Storing physical and strategic fault records in user-defined secondary fault memories associated with the RIOs and applications may facilitate retrospective fault analysis.

The VDM may be configured to triage detected strategic and physical faults in order to classify the detected faults as being either cause faults or consequence faults. Since the DTCs for strategic and physical faults are generated by the application functions and RIOs and transmitted to the VDM, the triaging of detected faults may comprise triaging the DTCs received from the application functions and RIOs, in which case the VDM may not require access to the raw output of the fault monitors that are run by the application functions and RIOs.

The central fault record may be maintained in a central fault memory system associated with the VDM. The central fault memory system may comprise a primary fault memory and a user-defined secondary fault memory. The VDM may be configured to store a record of cause faults in the primary fault memory and to store a record a consequence faults in the user-defined secondary fault memory.

The RIOs and application functions may be configured to determine an appropriate fault reaction upon detection of a physical or strategic fault, and to initiate the determined fault reaction.

According to a further aspect of the present invention there is provided a distributed diagnostics architecture for a vehicle. The diagnostics architecture comprises a plurality of application functions that are each configured to control a vehicle function. At least some of the application functions may be hosted on a central compute platform (CCP) of the vehicle. Alternatively, or in addition, at least some of the application functions may be hosted on one or more remote input/output concentrator modules (RIOs) or electronic control units (ECUs). I/O drivers for the application functions may be hosted on the RIOs or ECUs.

The application functions may be configured to run diagnostic fault monitors pertaining to strategic or system-level faults for their associated vehicle functions, and to transmit strategic fault data related to their associated vehicle functions to a vehicle diagnostics manager (VDM). Strategic fault data may be transmitted in the form of pass/fail data or alternatively confirmed diagnostic trouble codes (DTCs). Strategic fault data may be transmitted continuously, upon generation, or using an event driver interface.

The RIOs or ECUs may be configured to run diagnostic fault monitors pertaining to physical or component-level faults for their associated I/O devices, and to transmit physical fault data related to their associated I/O devices to the VDM. Physical fault data may be transmitted in the form of pass/fail data or alternatively confirmed DTCs. Physical fault data may be transmitted continuously, upon generation, or using an event driver interface.

The VDM may be configured to aggregate the received strategic and physical fault data, and to maintain a central fault record of strategic and physical faults. In particular, the VDM may be configured to triage detected faults, and to manage a record of cause faults and a record of consequence faults.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
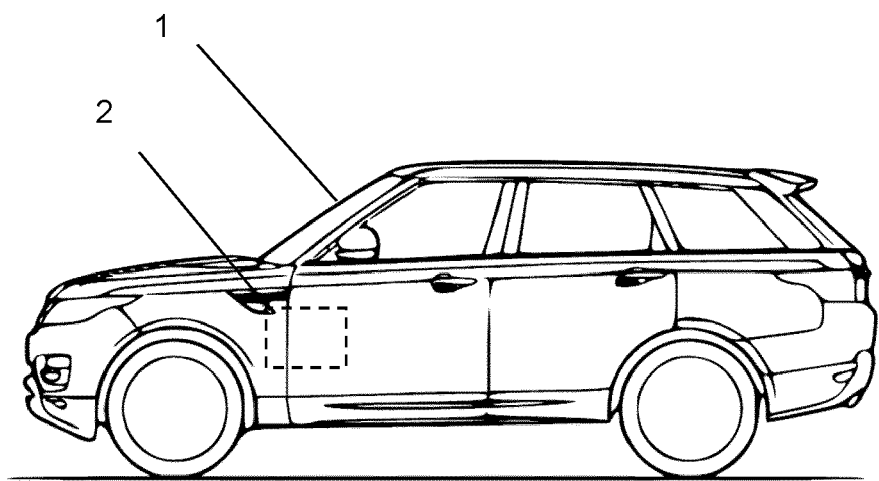
FIG. 1 schematically illustrates a road vehicle comprising a distributed diagnostics system in accordance with one possible embodiment of the present invention.
Figure 2:
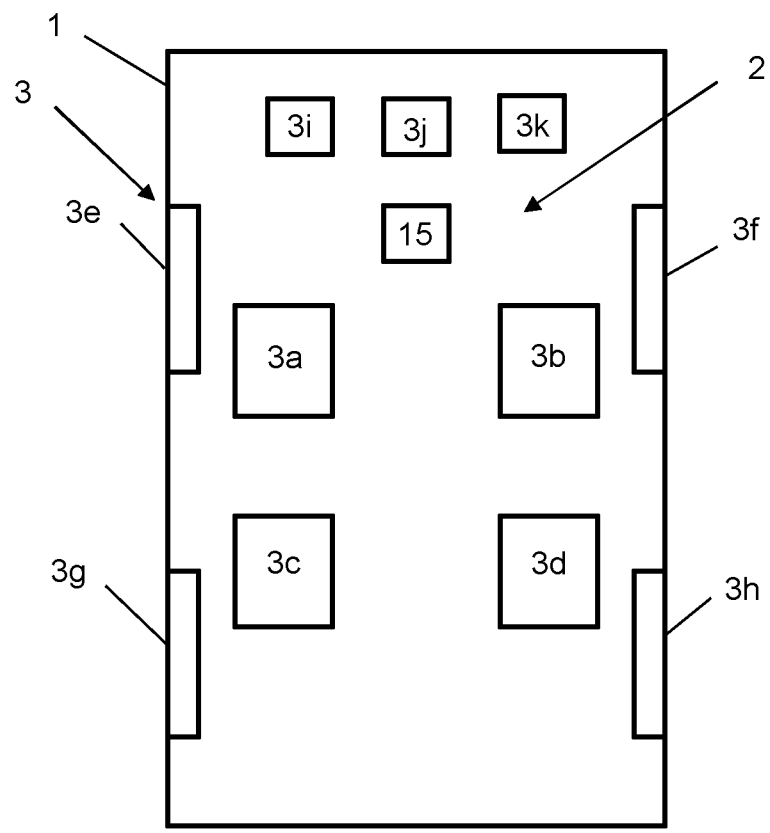
FIG. 2 schematically illustrates a selection of the vehicle's sub-systems.

FIG. 1 schematically illustrates a road vehicle 1 comprising a distributed diagnostics system 2 in accordance with one possible embodiment of the present invention. As is common in modern road vehicles, the vehicle 1 illustrated in FIG. 1 comprises a large number of sub-systems 3 that are configured to implement various different vehicle functions, some of which are illustrated in FIG. 2. The vehicle's sub-systems 3 include, for example, a front left seat 3a, a front right seat 3b, a rear left seat 3c, a rear right seat 3d, a front left door 3e, a front right door 3f, a rear left door 3g, a rear right door 3h, a windscreen wiper system 3i, a lighting system 3j and an alarm system 3k (among many other sub-systems not shown in FIG. 2).

Figure 3:
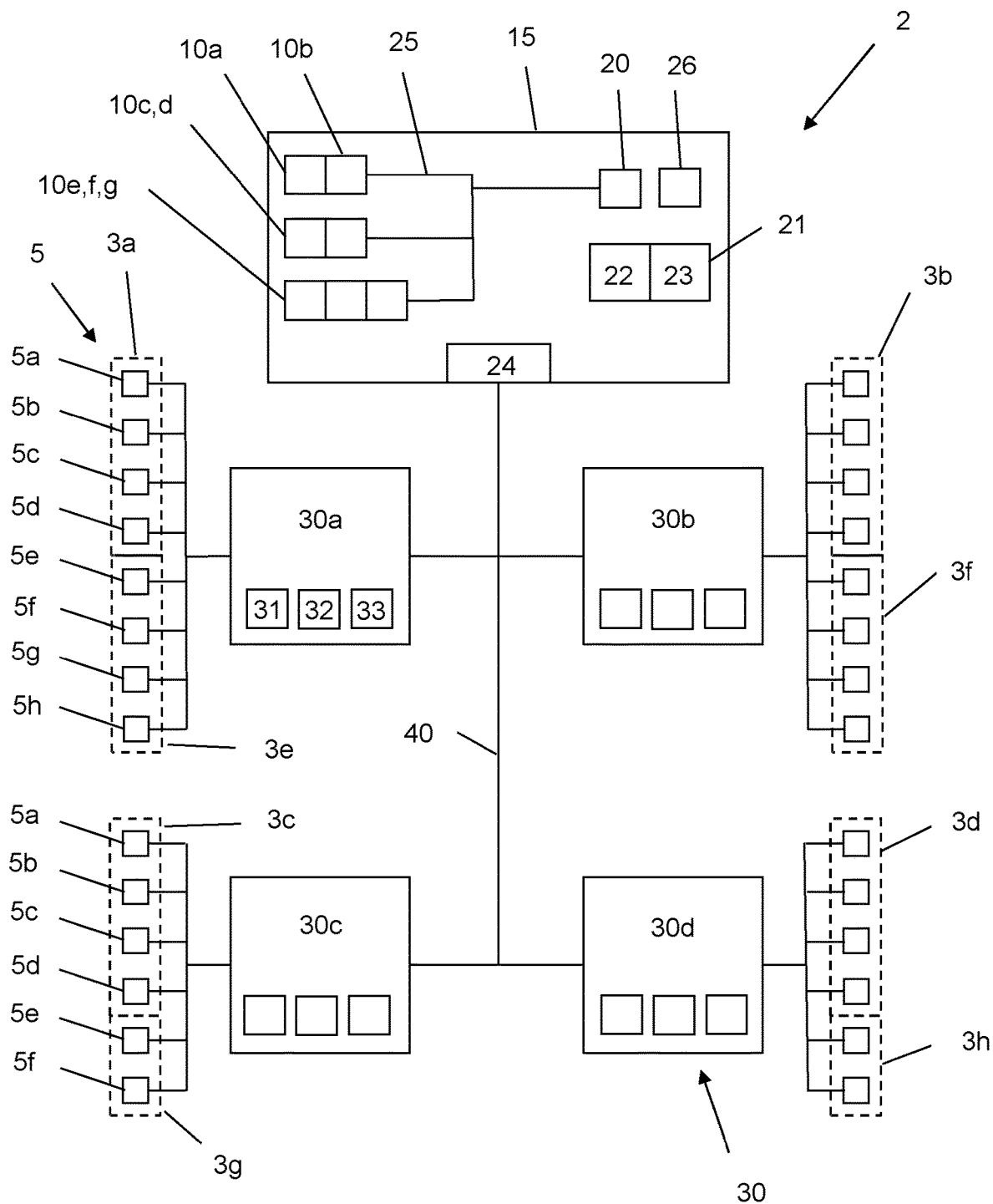
FIG. 3 schematically illustrates a portion of the vehicle's diagnostics system.

Each sub-system 3 includes various I/O devices 5 such as sensors and actuators that are required for implementing vehicle functions, some of which are illustrated in FIG. 3. For example, each seat sub-system 3a, 3b, 3c, 3d includes a height control motor 5a that is configured to adjust seat height, a height position sensor 5b that is configured to monitor seat height, a headrest control motor 5c that is configured to adjust the position of a headrest, and a headrest position sensor 5d that is configured to monitor headrest position (among other sensors and actuators not shown in FIG. 3). In addition, each door sub-system 3e, 3f, 3g, 3h includes a window control motor 5e and a window position sensor 5f, and the front door sub-systems 3e, 3f each include a mirror control motor 5g and a mirror position sensor 5h (among other sensors and actuators not shown in FIG. 3).

The vehicle 1 comprises a number of software applications or application functions 10 that are configured to control operation of the vehicle's various sub-systems 3 in order to implement functions of the vehicle 1, some of which are illustrated in FIG. 3. For example, the vehicle 1 comprises a cluster of seat application functions including a seat control function 10a for controlling the height of each seat using the height control motors, and a seat comfort function 10b for controlling the headrest position of each seat using the headrest control motors. In addition, the vehicle 1 comprises a cluster of door application functions including a window control function 10c for controlling the position of each door window using the window control motors, and a mirror control function 10d for controlling the position of the front left and front right door mirrors using the mirror control motors. The vehicle 1 also comprises a wiper control function 10e for controlling the windscreen wiper system 3i, a lighting control 10f function for controlling the lighting system 3j, and an alarm function 10g for controlling the alarm system 3k (among many other application functions not shown in FIG. 3).

In a conventional electrical architecture, each seat and each door of the vehicle would require one or more local ECUs for controlling vehicle functions such as adjusting seat height and opening and closing windows, with each ECU hosting one or more location-specific application functions and I/O drivers for the sensors and actuators related to the locally hosted application function(s). For example, the front left seat 3a might include a front left seat ECU hosting seat control and seat comfort functions for the front left seat, as well as drivers for the front left seat's sensors and actuators. Similar ECUs would also be required for the remaining seats and for each door.

However, in the electrical architecture illustrated in FIG. 3, the application functions 10 for controlling the vehicle functions related to the seats 3a-d, doors 3e-h, wiper system 3i, lighting system 3j and alarm system 3k have been moved away from local ECUs and onto a central feature hosting system or central compute platform (CCP) 15, thereby eliminating the need for separate ECUs to be provided for each seat and each door of the vehicle 1.

Since the application functions 10 are hosted centrally on the CCP 15, it is possible for each application function 10 to control its particular function for multiple sub-systems located in different zones of the vehicle 1 so that the number of application functions 10 required by the vehicle 1 can be reduced. For example, a single seat control function 10a hosted on the CCP 15 is able to control the height of each seat 3a-d of the vehicle 1, and a single window control function 10c hosted on the CCP 15 is able to control the window position for each door 3e-h of the vehicle 1.

It will be appreciated that the vehicle 1 will include a large number of other application functions in addition to those illustrated in FIG. 3. Some of these additional application functions may also be hosted on the CCP 15. However, other application functions may be hosted at different locations, for example on conventional ECUs and/or on remote input/output concentrator modules or RIOs (which are described in more detail below).

As shown in FIG. 3, the CCP 15 also hosts a vehicle diagnostics manager or VDM 20 which provides various vehicle diagnostics supervisory services to the vehicle 1. In particular, the VDM 20 is configured to create, store and manage a central, vehicle-wide record of detected faults in a central fault memory system 21 also located on the CCP 15, and to report detected faults to diagnostic clients such as on-board and off-board testers, as explained in more detail below.

As described above, the application functions 10a-d for controlling seat and door related vehicle functions are hosted centrally on the CCP 15 of the vehicle 1. However, the I/O devices that are required for implementing these vehicle functions (that is the sensors and actuators 5a-h associated with the vehicle seats 3a-d and vehicle doors 3e-h) still require local controllers closer to the I/O devices than the CCP 15. For this reason, the vehicle is provided with four remote input/output concentrator devices or RIOs 30, one for each major zone of the vehicle, as illustrated in FIG. 3, each of which hosts drivers 31 for and facilitates communication with I/O devices 5 related to multiple different application functions 10.

In particular, the vehicle 1 comprises a front left RIO 30a that hosts drivers for and communicates with the sensors and actuators of the front left seat 3a and front left door 3e; a front right RIO 30b that hosts drivers for and communicates with the sensors and actuators of the front right seat 3b and front right door 3f; a rear left RIO 30c that hosts drivers for and communicates with the sensors and actuators of the rear left seat 3c and rear left door 3g, and a rear right RIO 30d that hosts drivers for and communicates with the sensors and actuators of the rear right seat 3d and rear right door 3h. Drivers for the I/O devices of the wiper system 3i, lighting system 3j and alarm system 3k may also be hosted on one or more of above described RIOs 30.

It will be appreciated that the vehicle 1 may also include various other RIOs 30 and/or local ECUs in addition to the four RIOs illustrated in FIG. 3, which may host drivers for and communicate with other I/O devices not illustrated in FIG. 3.

The RIOs 30 are connected to their respective I/O devices 5 via CAN or LIN links. The RIOs 30 are also connected to the CCP 15 via a backbone link or wiring harness 40 of the vehicle. The backbone link or wiring harness 40 may, for example, provide an Ethernet or FlexRay link between the RIOs 30 and the CCP 15. Through the backbone link or wiring harness 40, the RIOs 30 are able to communicate with the application functions 10, for example for the purposes of receiving instruction signals from the application functions 10 and transmitting output data from their associated I/O devices 5 to the application functions 10.

As shown in FIG. 3, each of the RIOs 30, in addition to I/O and COM drivers 31, comprises a diagnostics server 32. The diagnostics server 32 of each RIO 30 is configured to run diagnostic tests or fault monitors pertaining to physical faults, which are faults associated with the I/O devices 5 and communication channels associated with that RIO 30. In particular, the diagnostics servers 32 of the RIOs 30 include device driver-level fault debounce logic that is configured to generate pass/fail data for specific physical faults. Physical pass/fail data may, for example, be generated by comparing actuator currents and sensor outputs to device-specific threshold levels.

For example, the diagnostic server 32 of the front left RIO 30a may be configured to compare the motor circuit current for the height control motor 5a of the front left seat 3a to a low threshold level in order to check for an open circuit failure condition, and to a high threshold level in order to check for a short circuit failure condition. As long as the motor circuit current remains between the low and high threshold values then both the open circuit fault monitor and the short circuit fault monitor will generate pass data. However, if the motor circuit current falls below the low threshold then the open circuit fault monitor will generate fail data. Similarly, if the motor circuit current exceeds the high threshold then the short circuit fault monitor will generate fail data.

In addition, the RIOs 30 include basic fault detection logic that is configured to detect physical faults, for example if fail data is generated by a specific physical fault monitor over a predefined time period or number of monitoring cycles. The RIOs 30 are also configured to determine and initiate appropriate fault reactions upon detection of a physical fault, for example disabling the relevant driver 31 until the fault has been repaired. However, the RIOs 30 are not required to generate confirmed DTCs for physical faults of their associated I/O devices 5 and communication channels, and so do not require DTC qualification logic for generating confirmed physical DTCs.

The RIOs 30 are configured to transmit all of the pass/fail data generated by the physical fault monitors to the VDM 20 via the vehicle's backbone link or wiring harness 40. For example, if the motor circuit current for the height control motor 5a of the front left seat 3a remains between the low and high threshold values then pass data will be transmitted from the front left RIO 30a to the VDM for both the open circuit fault monitor and the short circuit fault monitor. However, if the motor circuit current falls below the low threshold then fail data will be transmitted to the VDM for the open circuit fault monitor; and if the motor circuit current exceeds the high threshold then fail data will be transmitted to the VDM for the short circuit fault monitor.

As also shown in FIG. 3, the CCP 15 also comprises a diagnostics server 24. The application functions 10 hosted on the CCP 15 are each configured to run diagnostic tests or fault monitors pertaining to strategic faults, which are higher level faults related to the availability, performance or health of the application functions, using the common diagnostics server 24. In other embodiments the application functions 10 or clusters of application functions may have their own dedicated diagnostics servers for running their respective strategic fault monitors.

The diagnostics server or servers 24 of the application functions 10 include application function-level fault debounce logic that is configured to generate pass/fail data for specific strategic faults. Strategic pass/fail data may, for example, be generated in dependence on the availability and/or plausibility of signals received from the RIOs 30 and/or from other application functions. For example, the diagnostics server 24 may run a front left seat position control fault monitor that is configured to generate pass data while the height control motor 5a and height position sensor 5b of the front left seat 3a are functioning correctly, but to generate fail data if data from the height control motor 5a or height position sensor 5b is unavailable or implausible.

In addition, the application functions 10 include basic fault detection logic that is configured to detect strategic faults, for example if fail data is generated by a specific strategic fault monitor over a predefined time period or number of monitoring cycles. The application functions 10 are also configured to determine and initiate appropriate fault reactions upon detection of a strategic fault, for example disabling specific vehicle functions. However, the application functions 10 are not required to generate confirmed DTCs for strategic faults of their associated vehicle functions, and so do not require DTC qualification logic for generating confirmed physical DTCs.

The application functions 10 are also configured to transmit all of the pass/fail data generated by the strategic fault monitors to the VDM 20 via the service bus 25 of the CCP 15.

The frequency of communication of physical pass/fail data from the RIOs 30 and strategic pass/fail data from the application functions 10 to the VDM 20 is based on the periodicity of the individual fault monitors. For example, the RIOs 30 and application functions 10 may each be configured to transmit pass/fail data upon generation. In some cases pass/fail data may be transmitted every 100 ms, although other communication frequencies are also possible, and different communication frequencies may be used by different RIOs 30 and application functions 10.

The VDM 20 is configured to aggregate and triage the received strategic and physical pass/fail data from the application functions 10 and RIOs 30 in order to detect strategic and physical faults and classify the detected faults as being either cause faults (that is root cause faults that require a direct repair action) or consequence faults (that is faults that are caused or detected as a consequence of a root cause fault and may not require a direct repair action). The VDM 20 is further configured to maintain a record of cause faults in a primary fault memory portion 22 of the central fault memory system 21 (from which fault data is available to any diagnostic client that is connected to the vehicle's diagnostics system 2 using a standard UDS protocol interface), and to maintain a record of consequence faults in a user-defined secondary fault memory portion 23 of the central fault memory system 21 (which is available only upon receipt of a manufacturer-defined request).

For example, in the above-mentioned case of a failure of the height control motor 5a for the front left seat 3a, the VDM 20 may receive physical pass/fail data from the front left RIO 30a indicating that the height control motor 5a for the front left seat 3a has failed as well as strategic pass/fail data from the seat control application function 10a indicating that height adjustment is unavailable for the front left seat 3a. In this case, the VDM 20 may be able to triage these two detected faults and confirm that the root cause of the multiple detected faults is the failure of the height control motor 5a for the front left seat 3a. In this case the failure of the height control motor 5a would be recorded in the primary fault memory 22 of the central fault memory system 21, while the unavailability of height adjustment for the front left seat 3a would be recorded in the user-defined secondary fault memory 23 of the central fault memory system 21.

The above-example is a very simple example including only a single cause fault and a single consequence fault. However, it will be appreciated that larger groups of related faults including multiple root cause faults and/or multiple associated consequence faults may also be triaged in a similar manner.

The VDM 20 also includes DTC qualification logic that is configured to generate confirmed DTCs together with snapshot and extended data record information for detected strategic and physical faults in dependence on the strategic and physical pass/fail information received from the application functions 10 and RIOs 30 in parallel with the above-described triaging process. The VDM 20 is further configured to store generated DTCs in the either the cause fault record 22 or the consequence fault record 23 (depending on the outcome of the above-described triaging process) together with status byte data confirming the status of the DTC and associated snapshot and extended data record information.

Once one or more DTCs have been recorded in the central fault memory system 21, the VDM 20 is able to make the recorded DTCs available to diagnostic clients such as on-board and off-board testers. For example, if a diagnostic client such as a third-party off-board tester or alternatively an on-board tester 26 is connected to the diagnostics system 2 of the vehicle 1 using a standard UDS protocol interface then the VDM 20 will report the cause fault record including DTCs for all cause faults to the diagnostic client. However, the consequence fault record will not be reported unless a manufacturer-defined request is received by the VDM 20.

Since the VDM 20 is able to maintain a record of both strategic and physical faults during normal operation of the vehicle 1, it is not generally necessary for the RIOs 30 to maintain local records of physical faults. However, in order to ensure that a complete record of physical faults is maintained, the RIOs 30 are configured to record physical fault data in the case of an interruption of communication between the RIOs 30 and the VDM 20, for example due to a fault in the vehicle's wiring harness 40.

In particular, the VDM 20 is configured to maintain a keep alive interface with the RIOs 30 via the vehicle's wiring harness 40. As long as keep alive information is validly received by the RIOs 30, the RIOs 30 are configured to transmit the pass/fail data generated by the physical fault monitors to the VDM 20 without maintaining local records of physical faults. However, the RIOs 30 are configured, upon detecting an interruption in the keep alive interface, to start maintaining local physical fault records in user-defined secondary fault memories 33 associated with the individual RIOs 30. Since the RIOs 30 lack the fault qualification logic required for generating confirmed DTCs, the local fault records may record only the pass/fail outcomes of the physical fault monitors.

Since the VDM 20 is configured to receive fault data pertaining to strategic faults from the application functions 10 and fault data pertaining to physical faults from the RIOs 30, the diagnostics architecture of the present invention allows the VDM 20 to aggregate all of the fault data required in order to detect and triage physical and strategic faults, and to maintain a vehicle-wide record of faults.

In addition, since the VDM 20 has access to all of the pass/fail data generated by the strategic and physical fault monitors in the above-described embodiment, the VDM 20 is able to detect degraded health of components and vehicle functions, predict the occurrence of specific faults and triage faults before DTCs have been generated for those faults. However, the transmission of all pass/fail data generated by the strategic and physical fault monitors to the VDM 20 results in high signal traffic on the CCP's service bus 25 and the vehicle's wiring harness 40. An alternative embodiment of the present invention is therefore described below in which the frequency of communication of fault data to the VDM 20 is reduced.

The alternative embodiment employs a similar system architecture to that described above and illustrated in FIGS. 2 and 3. In particular, the alternative diagnostics system comprises a similar arrangement of application functions 10 hosted on a CCP 15 that are configured to control operation of various sub-systems 3 including, among others, the vehicle's front left seat 3a, front right seat 3b, rear left seat 3c, rear right seat 3d, front left door 3e, front right door 3f, rear left door 3g, and rear right door 3h. In addition, the alternative diagnostics system also comprises a similar arrangement of remote input/output concentrator devices or RIOs 30a, 30b, 30c, 30d that host drivers 31 for and facilitate communication with the I/O devices 5 associated with the above-mentioned sub-systems 3. In addition, the alternative diagnostics system also comprises a similar vehicle diagnostics manager or VDM 20 hosted on the CCP 15 that is configured to create, store and manage a central, vehicle-wide record of detected faults in a central fault memory system 21 also located on the CCP.

As in the first-described embodiment, the application functions 10 and RIOs 30 are each configured to run strategic and physical fault monitors in order to detect strategic and physical faults with their associated vehicle functions, I/O devices and communication channels; and to determine and initiate appropriate fault reactions independently of the VDM 20. However, the manner in which fault data is communicated from the application functions 10 and RIOs 30 to the VDM 20 is different, as explained in more detail below.

In particular, in this alternative embodiment, the application functions 10 are each provided with fault qualification logic for generating confirmed DTCs for strategic faults of their associated vehicle functions. The application functions 10 are further configured to maintain fault records of strategic faults in user-defined secondary fault memories associated with the application functions. Similarly, the RIOs 30 are each provided with fault qualification logic for generating confirmed DTCs for physical faults of their associated I/O devices and communication channels. The RIOs 30 are further configured to continuously maintain fault records of physical faults in their individual user-defined secondary fault memories. This is in contrast to the first-described embodiment, in which the application functions 10 do not maintain their own records of strategic faults, and the RIOs 30 maintain their own records of physical faults only in response to a detected interruption in communication with the VDM 20.

In addition, in this alternative embodiment, the application functions 10 and RIOs 30 are configured to only transmit the locally generated DTCs for the detected strategic and physical faults to the VDM 20 for triage and recording in the central fault memory system upon confirmation of the DTC, for example in response to a change in DTC status byte. This is in contrast to the first-described embodiment, in which the application functions 10 and RIOs 30 each continuously transmit the raw pass/fail data generated by the strategic and physical fault monitors to the VDM 20.

As in the first-described embodiment, the VDM 20 is configured to triage detected faults in order to classify the detected faults as being either cause faults or consequence faults. The VDM 20 is also configured to maintain a record of cause faults in the primary fault memory portion 22 of the central fault memory system 21, and to maintain a record of consequence faults in the user-defined secondary fault memory portion 23 of the central fault memory system 21. However, since the VDM 20 is arranged to receive DTCs for the detected strategic and physical faults from the application functions 10 and RIOs 30 instead of raw pass/fail data, the fault triaging process performed by the VDM 20 may be based on the received DTCs (instead of raw pass/fail data as in the first-described embodiment).

The above-description relates to two possible embodiments of the present invention. However, it will be appreciated that many modifications may be made to the above examples without departing from the scope of the present invention as defined in the accompanying claims.

The invention claimed is:

1. A distributed diagnostics architecture for a vehicle, the distributed diagnostics architecture comprising:
   a plurality of application functions hosted on a central compute platform (CCP) of the vehicle;
   a plurality of remote input/output concentrator modules (RIOs) installed at different locations within the vehicle; and
   a vehicle diagnostics manager (VDM),
   wherein the distributed diagnostics architecture includes at least one processor and memory,
   wherein each application function of the plurality of application functions is configured to:
   control an associated function of the vehicle;
   run diagnostic fault monitors pertaining to strategic faults of the associated vehicle function; and
   periodically transmit the output of the diagnostic fault monitors to the VDM,
   wherein each RIO of the plurality of RIOs is associated with and located in a corresponding zone of the vehicle, is connected to a plurality of associated I/O devices located at the corresponding zone of the vehicle, and is configured to:
   run diagnostic fault monitors pertaining to physical faults of the plurality of associated I/O devices; and
   periodically transmit the output of the physical fault monitors to the VDM,
   wherein the plurality of associated I/O devices includes a first I/O device associated with a first application function and a second I/O device associated with a second application function,
   wherein the plurality of application functions includes the first application function and the second application function,
   wherein the first application function is different from the second application function,
   wherein the first I/O device is a part of a first vehicle subsystem, and wherein the second I/O device is a part of a second vehicle subsystem that is different than the first vehicle subsystem, and
   wherein the VDM is configured to:
   aggregate the received fault monitor output data;
   detect strategic and physical faults in dependence on the received fault monitor output data; and
   maintain a central fault record of strategic and physical faults.

2. A distributed diagnostics architecture according to claim 1, wherein the VDM is configured to generate Diagnostic Trouble Codes (DTCs) for detected strategic and physical faults in dependence on the received fault monitor output data, and to store the generated DTCs in the central fault record.

3. A distributed diagnostics architecture according to claim 1, wherein the VDM is configured to triage detected strategic and physical faults in order to classify the detected faults as being either cause faults or consequence faults.

4. A distributed diagnostics architecture according to claim 3, wherein the triaging of detected faults comprises triaging the received fault monitor output data from the application functions and RIOs in order to classify the detected faults as being either cause faults or consequence faults.

5. A distributed diagnostics architecture according to claim 3, wherein the central fault record is maintained in a central fault memory system associated with the VDM, the central fault memory system comprising a primary fault memory and a user-defined secondary fault memory, wherein the VDM is configured to store a record of cause faults in the primary fault memory and to store a record of consequence faults in the user-defined secondary fault memory.

6. A distributed diagnostics architecture according to claim 1, wherein the RIOs and application functions are configured to detect physical and strategic faults, to determine an appropriate fault reaction upon detection of a physical or strategic fault, and to initiate the determined fault reaction.

7. A distributed diagnostics architecture according to claim 1, wherein the VDM is configured to maintain a keep alive interface with the RIOs, wherein the RIOs are configured, upon detecting an interruption in the keep alive interface, to start maintaining local fault records of physical faults.

8. An automotive vehicle comprising a distributed diagnostics architecture according to claim 1.

9. A distributed diagnostics architecture for a vehicle, the diagnostics architecture comprising:
   a plurality of application functions hosted on a central compute platform (CCP) of the vehicle;
   a plurality of remote input/output concentrator modules (RIOs) installed at different locations within the vehicle; and
   a vehicle diagnostics manager (VDM),
   wherein the distributed diagnostics architecture includes at least one processor and memory,
   wherein each application function of the plurality of application functions is configured to:
   control an associated function of the vehicle;
   run diagnostic fault monitors and detect strategic faults of the associated vehicle function; and
   report detected strategic faults to the VDM,
   wherein each RIO of the plurality of RIOs is associated with and located in a corresponding zone of the vehicle, is connected to a plurality of associated I/O devices located at the corresponding zone of the vehicle, and is configured to:
    run diagnostic fault monitors and detect physical faults of the associated I/O devices; and
    report detected physical faults to the VDM,
wherein the plurality of associated I/O devices includes a first I/O device associated with a first application function and a second I/O device associated with a second application function,
wherein the plurality of application functions includes the first application function and the second application function,
wherein the first application function is different from the second application function,
wherein the first I/O device is a part of a first vehicle subsystem, and wherein the second I/O device is a part of a second vehicle subsystem that is different than the first vehicle subsystem, and
wherein the VDM is configured to:
    aggregate the received strategic and physical fault notifications; and
    maintain a central fault record of strategic and physical faults.

10. A distributed diagnostics architecture according to claim 9, wherein the application functions and RIOs are configured to generate Diagnostic Trouble Codes (DTCs) for detected strategic and physical faults, and to transmit the generated DTCs to the VDM for storage in the central fault record.

11. A distributed diagnostics architecture according to claim 9, wherein the application functions and RIOs are configured to report detected faults to the VDM using an event-driven communication interface.

12. A distributed diagnostics architecture according to claim 9, wherein the RIOs are configured to maintain fault records of physical faults, and the application functions are configured to maintain fault records of strategic faults.

13. A distributed diagnostics architecture according to claim 12, wherein the physical fault records are maintained in user-defined secondary fault memories of the RIOs, and the strategic fault records are maintained in user-defined secondary fault memories associated with the application functions.

14. A distributed diagnostics architecture according to claim 9, wherein the VDM is configured to triage detected strategic and physical faults in order to classify the detected faults as being either cause faults or consequence faults.

15. A distributed diagnostics architecture according to claim 14, wherein the central fault record is maintained in a central fault memory system associated with the VDM, the central fault memory system comprising a primary fault memory and a user-defined secondary fault memory, wherein the VDM is configured to store a record of cause faults in the primary fault memory and to store a record a consequence faults in the user-defined secondary fault memory.

16. A distributed diagnostics architecture according to claim 9, wherein the RIOs and application functions are configured to determine an appropriate fault reaction upon detection of a physical or strategic fault, and to initiate the determined fault reaction.

17. An automotive vehicle comprising a distributed diagnostics architecture according to claim 9.

* * * * *